United States Patent
Burckhardt et al.

(10) Patent No.: US 11,477,199 B2
(45) Date of Patent: *Oct. 18, 2022

(54) ACCESS CONTROL IN MICROSERVICE ARCHITECTURES

(71) Applicant: International Business Machines Corporation, Armonk, NY (US)

(72) Inventors: Vincent Burckhardt, Clonee (IE); Andre Fischer, Hamburg (DE); Olgierd Pieczul, Castleknock (IE); Jürgen Schmidt, Hamburg (DE); Xiao F. Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 470 days.

This patent is subject to a terminal disclaimer.

(21) Appl. No.: 16/392,901

(22) Filed: Apr. 24, 2019

(65) Prior Publication Data

US 2019/0253424 A1 Aug. 15, 2019

Related U.S. Application Data

(63) Continuation of application No. 15/795,048, filed on Oct. 26, 2017.

(51) Int. Cl.
*H04L 9/40* (2022.01)
*G06F 21/62* (2013.01)
(Continued)

(52) U.S. Cl.
CPC .......... *H04L 63/101* (2013.01); *G06F 21/604* (2013.01); *G06F 21/6218* (2013.01); *H04L 41/28* (2013.01); *H04W 12/08* (2013.01)

(58) Field of Classification Search
None
See application file for complete search history.

(56) References Cited

U.S. PATENT DOCUMENTS

| 7,069,335 | B1 | 6/2006 | Layman et al. |
| 9,781,122 | B1 | 10/2017 | Wilson et al. |

(Continued)

FOREIGN PATENT DOCUMENTS

| CN | 105991613 A | 10/2016 |
| CN | 106100840 A | 11/2016 |

(Continued)

OTHER PUBLICATIONS

International Search Report and Written Opinion of the International Searching Authority for International Application No. PCT/IB2018/058090 dated Jan. 21, 2019, pp. 1-9.

(Continued)

*Primary Examiner* — Izunna Okeke
*Assistant Examiner* — Bassam A Noaman
(74) *Attorney, Agent, or Firm* — Shackelford, Bowen, McKinley & Norton, LLP

(57) ABSTRACT

A method, system and computer program product relating to an application server operable to manage a microservice-based application, i.e. app, on behalf of clients, the clients being available for use by system actors who may be, for example, end users, bots, developers or other apps. A permissions validator is used to compute effective permissions in response to client requests. The requests are granted or denied conditional on the effective permissions being at least a subset of the permissions required to be given by any of the app's microservices that are needed for the resource being requested. The effective permissions are computed from an intersection of a set of actor permissions, a set of client permissions and a set of resource permissions.

7 Claims, 10 Drawing Sheets

(51) Int. Cl.
    *G06F 21/60*     (2013.01)
    *H04L 41/28*     (2022.01)
    *H04W 12/08*     (2021.01)

(56) References Cited

U.S. PATENT DOCUMENTS

| | | | |
|---|---|---|---|
| 10,387,631 B2* | 8/2019 | Duggal | H04L 67/00 |
| 2012/0174204 A1 | 7/2012 | Sturm et al. | |
| 2016/0124742 A1 | 5/2016 | Rangasamy et al. | |
| 2016/0366151 A1 | 12/2016 | Tamura | |
| 2017/0063833 A1 | 3/2017 | Colle et al. | |
| 2017/0070504 A1 | 3/2017 | Ramachandran et al. | |
| 2017/0093857 A1 | 3/2017 | Hinohara et al. | |
| 2017/0223057 A1 | 8/2017 | Amiri | |
| 2017/0230349 A1 | 8/2017 | Gaur et al. | |
| 2017/0331829 A1* | 11/2017 | Lander | G06F 21/6218 |
| 2018/0302391 A1* | 10/2018 | Jones | H04L 63/083 |
| 2019/0080062 A1* | 3/2019 | Easley | G06F 21/313 |
| 2019/0095241 A1* | 3/2019 | Ago | G06F 9/468 |

FOREIGN PATENT DOCUMENTS

| | | | |
|---|---|---|---|
| JP | 2012033189 A | 2/2012 |
| JP | 2017004301 A | 1/2017 |
| JP | 2017068596 A | 4/2017 |

OTHER PUBLICATIONS

Bill Doerrfeld, "How to Control User Identity Within Microservices," https://nordicapis.com/how-to-control-user-identity-within-microservices. May 14, 2015, pp. 1-18.

Prabath Siriwardena, "Securing Microservices (Part I)," https://medium.facilelogin.com/securing-microservices-with-oauth-2-0-jwt-and-xacml-d03770a9a838, Apr. 12, 2016, pp. 1-17.

List of IBM Patents or Patent Applications Treated as Related, Apr. 26, 2019, pp. 1-2.

Office Action for U.S. Appl. No. 15/795,048 dated Oct. 24, 2019, pp. 1-33.

Office Action for U.S. Appl. No. 15/795,048 dated Apr. 9, 2020, pp. 1-42.

Response to Examination Report for UK Application No. GB2007338.3 dated Mar. 28, 2022, pp. 1-8.

Examination Report for United Kingdom Application No. GB2007338.3 dated Jan. 26, 2022, pp. 1-2.

Decision to Grant a Patent for Japanese Patent Application No. 2020-520757 dated Jan. 6, 2022, pp. 1-2.

Examination Report for Application No. GB2007338.3 dated Apr. 26, 2022, pp. 1-3.

* cited by examiner

ACCESS CONTROL IN MICROSERVICE ARCHITECTURES

TECHNICAL FIELD

The present invention relates generally to access control, and more particularly to providing access control in a microservice architecture.

BACKGROUND

Access control is a known area of information technology. Over the last 50 years several access control models have been developed. However, modern computer program paradigms require refinement and practical interpretations of those models. This is particularly important in the context of agile development techniques where there is a requirement to develop and deliver new applications in ever shorter times. Providing a suitable access control framework for a complex application is not trivial and known models are not easily adoptable.

Microservice architecture is becoming increasingly popular. A microservice architecture decomposes an application into a set of small inter-operating applications. These small applications are the microservices. Each microservice focuses on a particular element of functionality separately from higher level services. The microservices concept makes it easier to update and modify applications, since it allows developers to focus on small pieces of functionality without having to understand the system-level operation of the application. The traditional approach to access control is to provide a common access control layer at the uppermost system level. However, this approach goes counter to the microservice architecture model. This is because a common access control layer is a component that has to duplicate at least some logic from every microservice and would therefore need to be updated or at least reviewed every time there was a change in one of the microservices or a new microservice was added. This would increase development cost by requiring a coordination of changes between the microservices and the common access control layer.

In addition, modern enterprise applications typically separate the server-side application programming interface (API) layer from a client-side layer. (The API may for example be a REST-ful API, where REST stands for Representational State Transfer.) Often such applications interact with their clients externally from the core of the application and the end-user applications run as two separate components. There is a server-side application providing only the APIs, often provided by a set of microservices, and a client-side application providing the user interface and interacting with the API layer. Such apps include a default web UI (User Interface) of the service, mobile and desktop apps and so forth, but also third-party apps which extend and customize service functionality.

Different clients may be given different access to the application. Some, such as the internal/default apps, can be given pre-defined access rights, whereas others may require explicit approval for access by the organization administrator or end user. As well as being able to support multiple services and multiple clients, the access control mechanism needs to be able to support typical enterprise use cases such as resource-specific policies, user roles, service-to-service access and so forth.

SUMMARY

In one embodiment of the present invention, a computer automated method to support management of an application for clients, the clients being available for use by system actors, and the application providing one or more resources for clients, each resource being associated with at least one app, and each app comprising a plurality of microservices, the method comprises receiving a request by a client, made under instruction of a system actor, to access a resource in order to perform a function. The method further comprises computing, by a processor, a set of effective permissions in response to the request from an intersection of a set of actor permissions, a set of client permissions and a set of resource permissions, the actor permissions being permissions assigned to a system actor, the client permissions being permissions assigned to a client for the system actor; and the resource permissions being permissions assigned to the resource's requestable functions for the system actor. The method additionally comprises granting or denying, by the processor, the request conditional on the effective permissions being at least a subset of the permissions required to be given by any of the app's microservices that are needed for the resource being requested.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
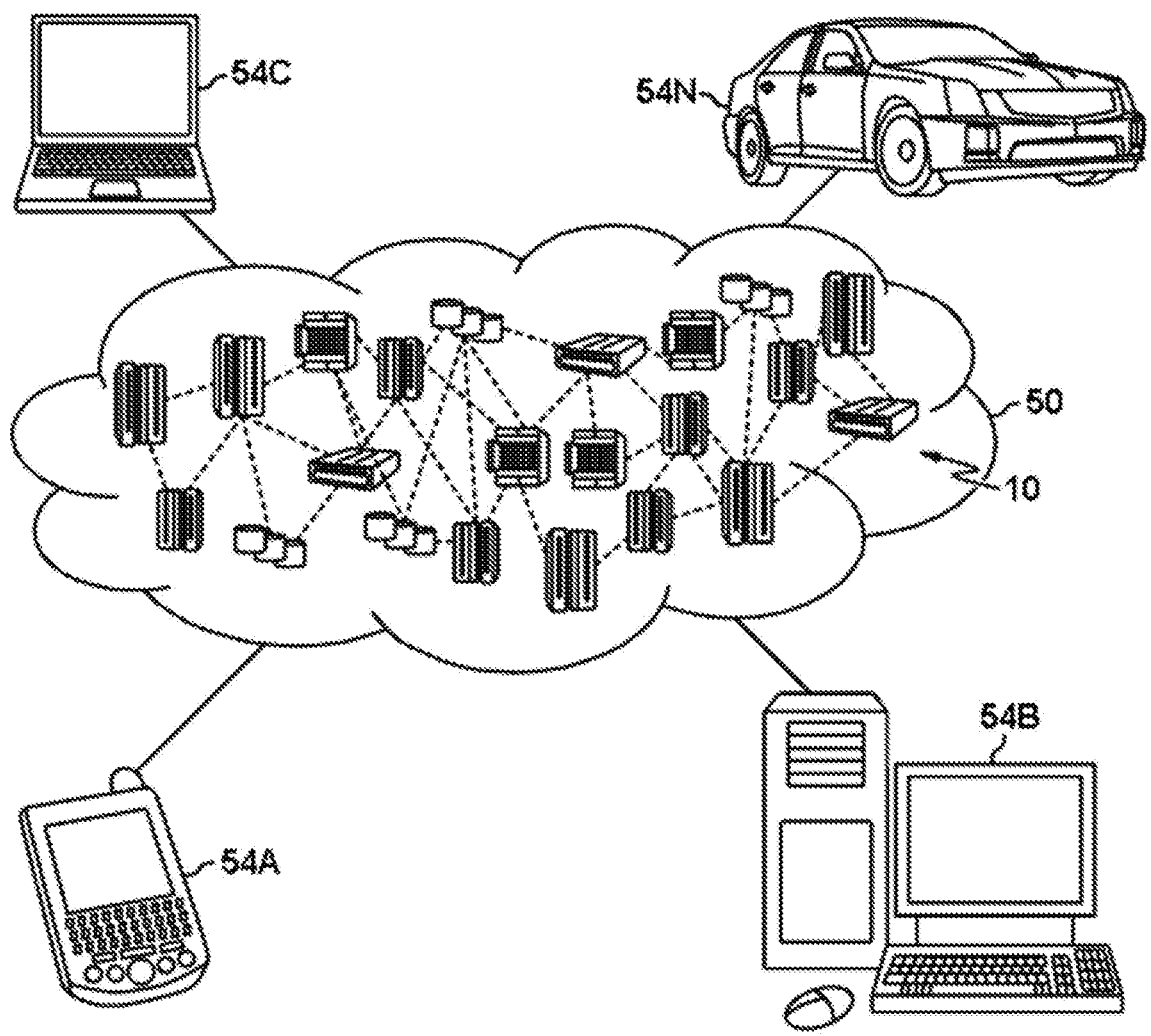
FIG. 1 depicts a cloud computing environment according to an embodiment of the present disclosure.

The goal of the present disclosure is to provide an access control model that is adapted for a microservice-based system environment. Within the overall model, one aspect provides a method and computer program product to provide access control at runtime implemented in a way that reflects the use of microservices. Another aspect provides software developers with tools for adding a new microservice to an application in a way that its permissions requirements are automatically integrated into the application. The new microservice may be completely new, or an updated version of an existing microservice.

The proposed access control model provides separate access control rules that can be applied to system actors, clients and resources, while providing a single-step check for microservice developers, thereby isolating developers from having to consider factors that are outside the scope of the microservice being developed.

The proposed model further allows mapping between identity (e.g. user) roles and specific access control decisions to be contained within specific microservices whose role it is to make permissions evaluation, while allowing other services, whether they be microservices or higher level services, to use the access decisions made by the permissions-evaluating microservices without having to understand or have knowledge of the logic behind those decisions embedded in the permissions-evaluating microservices.

According to one aspect of the disclosure, there is provided a computer system comprising:

an application server operable to manage an application for clients, the clients being available for use by system actors, and the application providing one or more resources for clients, each resource being associated with at least one app, and each app comprising a plurality of microservices; and a permissions validator operable to compute a set of effective permissions in response to a request by a client, made under instruction of a system actor, to access a resource in order to perform a function, and to grant or deny the request conditional on the effective permissions being at least a subset of the permissions required to be given by any of the app's microservices that are needed for the resource being requested, wherein the effective permissions are computed from an intersection of a set of actor permissions, a set of client permissions and a set of resource permissions, actor permissions being permissions assigned to a system actor;

client permissions being permissions assigned to a client for said system actor; and resource permissions being permissions assigned to the resource's requestable functions for said system actor.

In some embodiments, the application server is operable on request to generate a client-accessible permissions credential which stores an intersection of the set of actor permissions and the set of client permissions, the permissions validator being operable to read the permissions credential to extract the intersection of actor and client permissions when computing the effective permissions. On or more actor types may be given rights to manage permissions credentials. Said rights may include one or more of: a right to request generation of a permissions credential, a right to revoke a permissions credential, and a right to show permissions credentials currently in existence.

One example permissions credential is a token, for example a JSON web token.

The permissions validator may itself be delivered as a microservice available to be called by the plurality of microservices.

In some embodiments, each resource is configured to store, or have stored for it, a set of resource permissions pertaining to that resource.

The computer system may further comprise a third party server on which the apps are implemented separate from the application server, and the permissions validator microservice may be hosted by such a third party server. Alternatively, the permissions validator microservice may be hosted by the application server.

The actors in some embodiments include an end-user type, in which case the client may be provided with a user interface for end-user type actors. The actors in some embodiments include a developer-user type, in which case the client may be provided with a user interface for developer-user type actors. The actors in some embodiments may include an app type to enable apps to call functions and be granted or denied permissions accordingly.

According to one aspect of the disclosure, there is provided a computer automated method to support management of an application for clients, the clients being available for use by system actors, and the application providing one or more resources for clients, each resource being associated with at least one app, and each app comprising a plurality of microservices, the method comprising:

receiving a request by a client, made under instruction of a system actor, to access a resource in order to perform a function;

computing a set of effective permissions in response to the request from an intersection of a set of actor permissions, a set of client permissions and a set of resource permissions, the actor permissions being permissions assigned to a system actor, the client permissions being permissions assigned to a client for said system actor; and the resource permissions being permissions assigned to the resource's requestable functions for said system actor; and granting or denying the request conditional on the effective permissions being at least a subset of the permissions required to be given by any of the app's microservices that are needed for the resource being requested.

According to another aspect of the disclosure, there is provided a computer program stored on a computer readable medium and loadable into the internal memory of a computer apparatus, comprising software code portions, when said program is run on a computer apparatus, for performing the above-defined method. The computer program may be contained in a microservice that is deliverable as a service. A computer program product may also be provided which stores the above-mentioned computer program.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
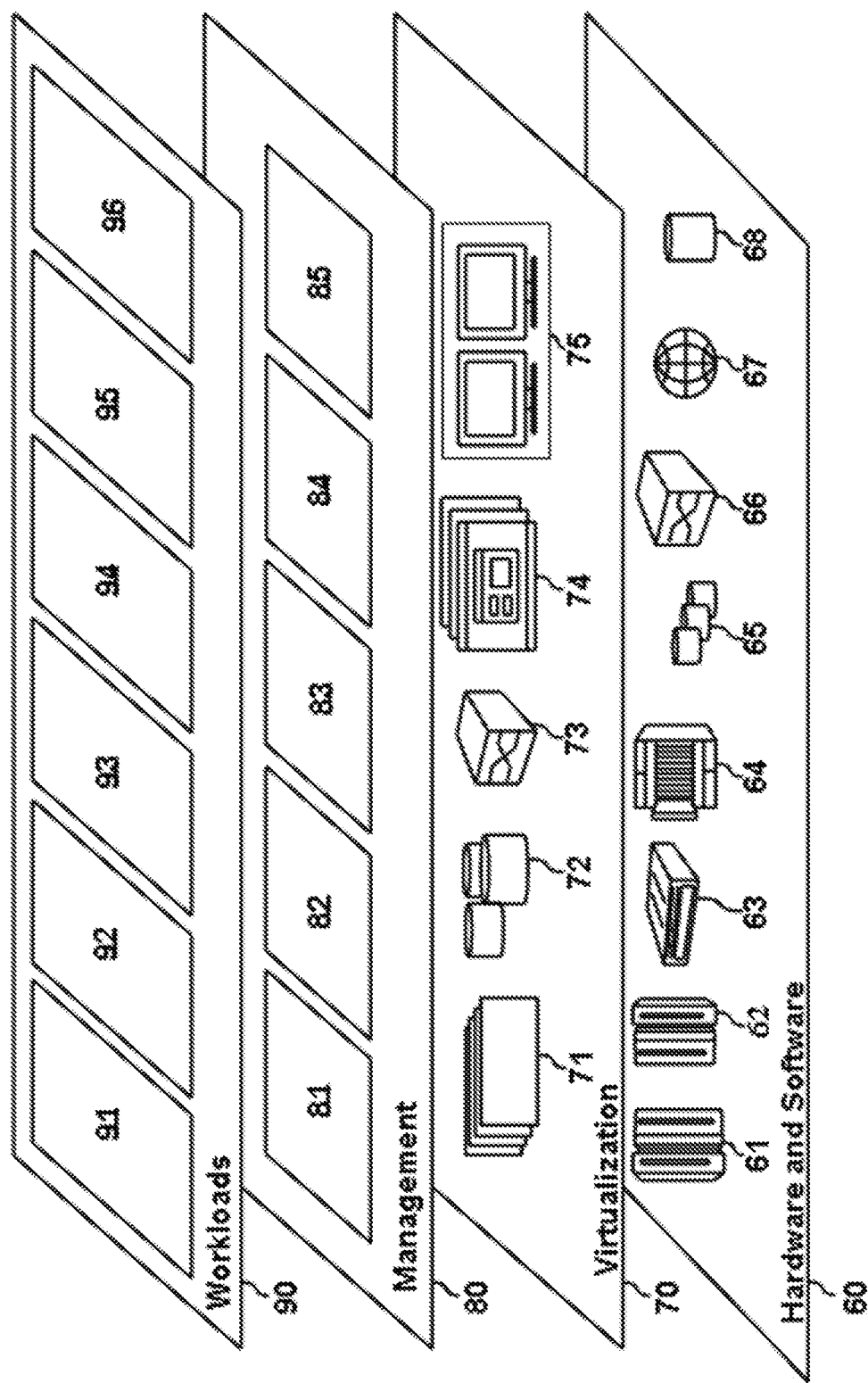
FIG. 2 depicts abstraction model layers according to an embodiment of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and software development cycle management 96 according to embodiments of the invention.

Figure 3:
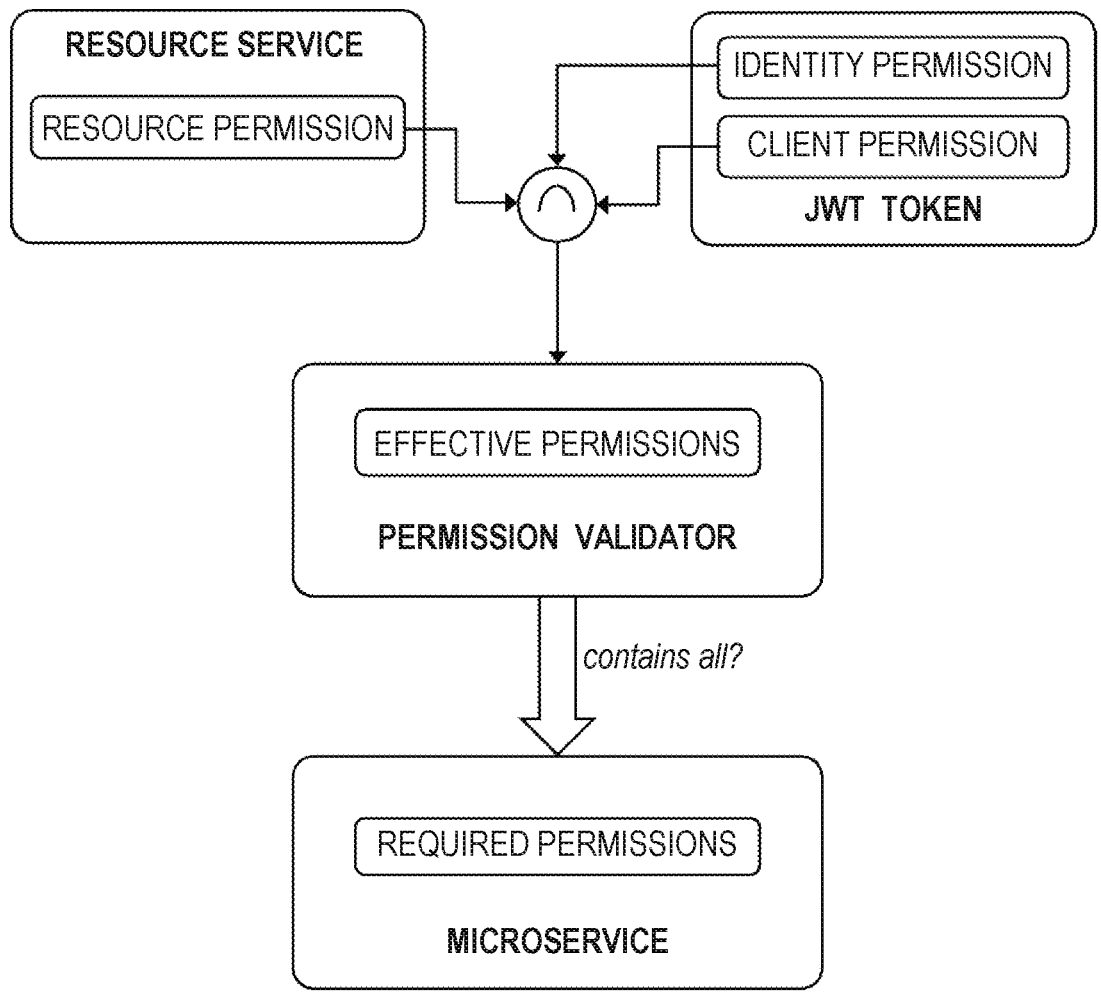
FIG. 3 is a diagrammatic representation showing the division between dynamic permissions for a client or identity, as contained in a JWToken, and static permissions for a resource such as a group, as contained in a microservice, and how the permissions are validated, according to an embodiment of the invention.

FIG. 3 is a diagrammatic representation of the division between dynamic permissions for a client or identity and static permissions for a resource such as a group, and also shows how the permissions are validated, according to an embodiment of the invention. It is envisaged that the permissions validation process takes place in a client-server system, such as exemplified by an enterprise cloud application, with a separation between server-side applications and client-side applications. Specifically, we consider a system with a server-side API layer on the client-side, such as a RESTful API, and a server-side layer comprising a number of interoperable microservices. The server-side application provides the APIs through a set of microservices and the client-side application provides the UI to act as a buffer between the users and the server-side API layer. Example client-side apps may include a default web UI (User Interface) of the service, mobile and desktop apps and so forth, but also third-party apps which extend and customize service functionality. Permissions are contained in and conveyed by JSON web tokens (JWTokens). JSON is an open standard defined in RFC7519, RFC7515, RFC7516 and RFC7797. Of these standards, RFC7519 relates to creating JWTokens. The JWToken is signed by the server's key to enable a client to verify its authenticity. The purpose of a JWToken is to allow secure communication between client and server. JWTokens are access tokens created by a server for its clients which contain "claims" which are made by the client to the server, "claims" being the term used in RFC7519. In the context of the present document, the claims referred to in RFC7519 are the permissions. The JWTokens can be stored at the client in client-side storage, e.g. in JavaScript LocalStore. A JWToken is a type of client-accessible credential.

A simplified form of a JWToken might be as follows:

```
{... header ..}
{
    "iss": "Some Service",
    "iat": 1478526974,
    "exp": 1510062974,
    "aud": "test",
    "sub": "johh.smith@example.com"
}
SIGNATURE
```

As illustrated in FIG. 3 by way of example a JWToken is used to contain the dynamic permissions relating to the client and the identity. The static permissions for a resource, such as a group, are stored elsewhere, e.g. in microservice relevant for that resource.

The key terminology we define for describing our solution is as follows:

IDENTITY—an actor in the system (e.g. end user, bot, app, developer, admin, internal service)

CLIENT—any software component interacting with a server, e.g. through a system's API. Example clients are: web client, mobile client, user interface (which may be considered a subtype of web client) e.g. for subscription admins, app reviewers, app developers, external tools, such as Postman, used by developers to develop, test and explore API calls.

RESOURCE—any resource in a system (e.g. file, group, chat room)

PERMISSION—a specific access permission to perform a functionality (for example permission to upload a file). Permission types include base permissions and aggregated permissions. Aggregated permissions are an intermediary between static and dynamic permissions in that an expansion of an existing permission can be modified (by code change) to include or exclude base permissions. This allows the effective permissions of a JWToken to be changed while it is still in the possession of a user.

Permissions are applied independently for Identity, Client and Resource. Let P define a function that provides a set of permissions for a given Identity (I), Client (C) and Resource (R). The set of effective permissions for I using C to access R is defined as follows:

$$\text{Effective Permissions}=P(I)\cap P(C,I)\cap P(R,I)$$

According to this formula, the effective permissions are determined from the intersection of the permissions for: a specific identity; that identity and a client; and that identity and the resource to be accessed. In the following we use the term "effective permissions" in the sense defined by the above formula to distinguish it from talking about other kinds of permissions. Effective permissions are typically not stored but computed when needed.

In our proposed approach, permissions are separated into dynamic (i.e. runtime) and static types. Identity and client permissions will be dynamic and resource permissions will be static. The dynamic permissions are specific to runtime and are assigned dynamically, e.g. assigned specifically for a user session, for example through issuing a credential, which may be a token, such as a JWToken. Permissions relating to resources are properties of the resource and will thus be static, i.e. independent from session. These static permissions, e.g. group permissions, can be stored in and managed by respective microservices associated with the respective resources. A static permission can be fetched or read when needed to check access rights associated with the associated resource.

This way, an access check that is not related to a particular resource can be performed solely based on a user session, for example by checking a permission stored in a JWToken. On the other hand, and an access check that is related to a resource involves both checking for runtime permissions, e.g. via a JWToken, and checking the resource-specific static permission obtained from a relevant microservice.

Our favored way of implementing the functionality for checking permissions among microservices is to provide this functionality through one or more microservices. However, it would also be able to provide the permissions-checking functionality through an external agent or higher level control layer. For example, permission checks could be moved to a "firewall" layer with access to JWToken and also resource and group permissions. The firewall layer could be given access to resource permissions via the group service database and/or given the ability to make API calls to the group service to obtain group permissions. Moreover, the permissions definitions, currently declared by @Permissions JAVA annotations could be moved, copied or extracted to a database to allow a lookup of required permissions for each endpoint.

A single microservice could provide all permission-validation functions. However, in our best mode we propose that multiple microservices are provided, each for a different kind of permission. While the names and roles of these permission-providing microservices may vary, a possible set of permission-providing microservices could be as follows:

Identity service: a component which provides a system of record for system actors and defines a maximum level of access that is possible for a specific identity. The maximum level may be defined by technical constraints of what is possible, or by policy constraints of what is allowed. In practice, the identity service may call additional microservices to establish these permissions, for example by checking user's entitlements or active subscriptions.

Authentication service: a component which issues authentication tokens to users, such as clients, dynamically during sessions and which is responsible for establishing user/client-level permissions. The authentication service may request end-user approval, or look for any pre-existing authorizations for users, clients or other criteria.

Functional services: a component responsible for managing specific resources, such as chat rooms, and which provides information about permissions related to those resources in its own capacity. For example, a chat room service that is aware of a user role in a chat room, maps the user to specific permissions for user actions in that chat room based on configurable policy. This way, while the service has a mechanism to identify those permissions, it does not need to have awareness of their meaning.

The interaction of developers and users with apps will of course be quite different. Developers will focus on setting up sets of permissions for the apps they are developing so that when they are placed in the application for users to access they will function as desired. Users on the other hand will review sets of permissions that are available for configuration and decide whether to grant or deny them to a particular app. To facilitate interaction with the permissions for developers and for users we provide respective templates:

permission Template: for app entities to define a set of permissions that will be assigned to the app in a specific group when the app is added to that group, and scopeTemplate: for clients to define a set of permissions assigned to the client.

An app can act (e.g. call API endpoints) on behalf of a user or on its own behalf. When it acts on behalf of a user it bears the identity of that user. Its permissions are the intersection of the user's permissions, the permissions requested to obtain the JWToken and the scopeTemplate defined in the app's entity in the app registry. The permissions can be requested in an OAuth flow, where OAuth is an open standard to enable client access to (web) servers within Hypertext Transfer Protocol (HTTP). OAuth provides a framework by which access tokens can be issued to clients by an authorization server with the approval of the resource owner. The client then uses the access token to access the protected resources hosted by the resource server.

When the app acts on its own behalf, then the identity is that of the app.

Note that when we say an app is called "on behalf of a user", this is a description with respect to the calling side. The API back-end will see a JWToken either as being for an app identity (app on behalf of its own) or a user identity (app on behalf of a user). It does not know, or need to know in most cases, that in both cases the caller is the same app, although this could be determined with a service-to-service call, if desired.

An example implementation is now described. A collaboration application allows users to communicate using persistent chat rooms. Chat rooms can contain users and bots. In each chat room members can send messages, upload files and images and so forth. The application is implemented as a set of microservices. For instance, the 'group service' manages chat room membership, a 'chat service' handles messages, 'file service' manages uploading and downloading of files and so forth. Users can be given a different levels of access within the chatroom service. For example, 'human users' can create chat rooms and 'bots' cannot. Moreover, the application allows roles such as users and admins and these roles differentiate user's access permissions. For example, a 'chat room owner' can add new apps to the chat room while a normal user cannot. In addition, the application allows users to authorize any number of apps to act on their behalf and gives a different level of access (within the access permissions that a user already has) to those apps. In particular, the default UI for the application is a selected one of such apps that is pre-approved by default. The application uses a JWToken to allow client access to its APIs. Further, a team concept can be included, whereby users can be assigned as belonging to one or more teams. Each team can have administrators with additional access permissions to permit access to administer resources in the system. The challenge is how to express all those authentication concepts in an application implemented using multiple microservices, each handling a specific functionality and not generally aware of the operation of the others.

For example, a file delete operation may be allowed or not at runtime because of:

user type being allowed to delete files client being approved to delete files on behalf of the user user having a role in the chat room that allows them to delete files in the specific chat room chat room having capability of file operations (e.g. created for a team with a license that allows file operations)

an organization administrator being able to delete any file in the chat room of their organization an internal service being able to delete a file in any chat room (e.g. if the file includes a virus or is reported as inappropriate)

and so forth.

Encoding all of those decision factors into a file service is not the intended approach, since the design goal is that the file service should not have to understand the logic related to all relevant fragmented factors, such as those listed above. Such an approach would not only create unnecessary complexity in the file service, but would also make it difficult to understand and change any policies, such as changing which roles can delete files, or adding a new role with some, but not all, of the access rights of an administrator. Rather, with the proposed approach, a file service is provided, which is an example of the functional service defined above. The file service is responsible for granting permissions to perform actions on files, such as copy, move, delete, create, duplicate (denoted file.copy, file.move, file.delete, file.create, file.duplicate). For example, to approve or deny a file deletion request, the file service will have to only check for permission "file.delete" in the context of the specific chat room where the delete operation has been requested. This needs only the following operations to be performed by the file service:

checking if "file.delete" is included in identity permissions in JWT. This may be based on user role or entitlements, user type, or internal service
  checking if "file.delete" is included in in client permissions in JWT. This may be based on user authorizing client to perform file operations
  checking if "file.delete" is included in the resource permission for a specific resource (in this case chat room) by accessing group service. This may be based on user having specific role in the chat room.

Only when the intersection formula for effective permissions determines that the necessary permission exists is the file deletion acted on. Here we also note that the individual elements of logic needed to check the permissions are self-contained in their respective microservices.

We now provide an overview of the use of permissions (identity, client, resource) for apps. Many actions in an application for a group messaging client, such as IBM Watson Workspace, will be guarded by permissions. Only if the caller has the requested permissions, the action is executed. One example for such actions is API calls. First of all, let us define some app-related terminology when "app" is used as an adjective to convey different concepts and contexts.

App Identity (e.g. App User): The identity of the app user. This is stored in a service called People Service. This is created when a new app is created via an API call to App Registry. A JWToken is issued to the App Identity by calling OAuth with App_ID, i.e. the Client_ID, and optionally a client secret, Client_Secret, e.g. for web server apps. In OAuth the Client_ID is a public identifier for apps.

App Entity: Is an entity in the app registry database. It contains the ID of the app identity and its password (Client_Secret). It also contains outbound webhooks and conversations, which are stored in other microservices and can be accessed with the app id).

App Implementation: An implementation of app functionality, typically on a 3rd party server. Webhook URLs, configuration URLs, Terms-of-service URLs will all typically point to the App Implementation.

App Concept: App concept is a collective term for individual elements of an app, principally App identity, app entity and app implementation. An app has an implementation on an external service, is expressed in a database as app entity and has an identity that can be used to make API calls in the name of the app. In some discussions the term app may be used as a synonym for app concept, or when referring to one particular element of an app. From a developer perspective, development of an app (concept) involves: providing its implementation (e.g. rent a server to host it); registration of the app in an application to create the app entity in a database of an app registry microservice; and setting up and managing the app identity by providing an app identity and password.

These examples demonstrate the more general principles that a permission is bound to an identity, but one identity can have different permissions in different contexts.

When an app or a user or a developer makes an API call then two sets of permissions are compared. The permissions that the micro service that implements the API defines as requirement for the call and the permissions that have been granted to the caller. Only when the caller has all the required permissions, the call is accepted.

The evaluation process may involve the following components:

Determine the set of permissions that guard the API call (guarding permissions)
  Expand the guarding permissions to a set of base permissions
  Determine the sets of permissions that are granted to the caller (granted permissions) which are:
    identity permissions, defined only by the caller
    client permissions, defined by the caller and by the client that is used to make the call
    optionally group permissions, defined by the identity as member of a group (e.g. a space). Group permissions are evaluated for API calls that are made in the context of a group
  Expand the granted permission sets individually into sets of base permissions
  Compute the intersection of all sets of granted base permissions In this way, the effective permissions can be arrived at.

Figure 4:
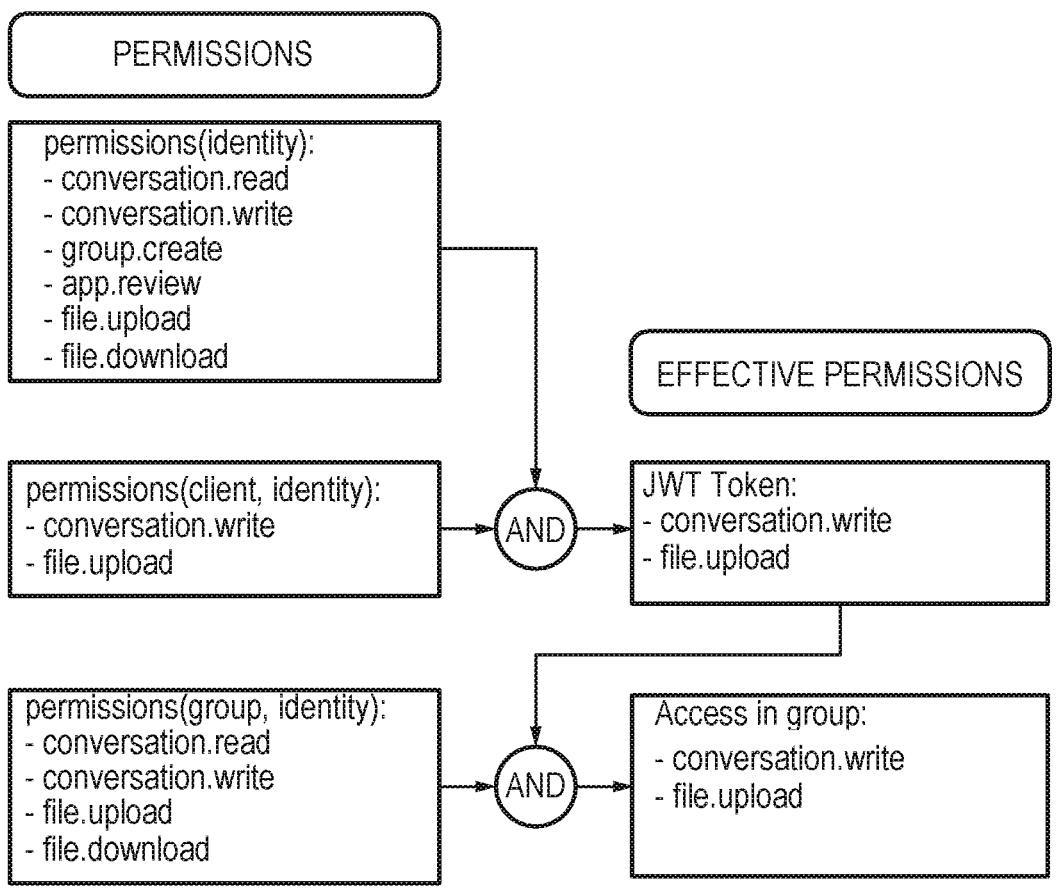
FIG. 4 is a diagrammatic representation of an example mapping between permissions and effective permissions according to FIG. 3.

FIG. 4 is a diagrammatic representation of an example mapping between permissions and effective permissions according to FIG. 3 that follows the process as just described. Here, a list of identity permissions is ANDed with a list of client-and-identity permissions, the result list is then loaded into a JWT, which is then ANDed with a group-and-identity permissions list to provide the net result, i.e. the effective permissions, which is the intersection of all three sets of granted base permissions. The last part of the permissions evaluation is to compare the effective permissions with the required permissions, as illustrated in FIG. 3, where the required permissions can be thought of as those that are guarding the access. Access to the resource is thus granted conditional on the required permissions being at least a subset of the effective permissions. (For the avoidance of doubt, it is noted that the texts of the lists in FIG. 4 and the logical operation links and the AND operations form part of the written description of the present disclosure.)

Figure 5:
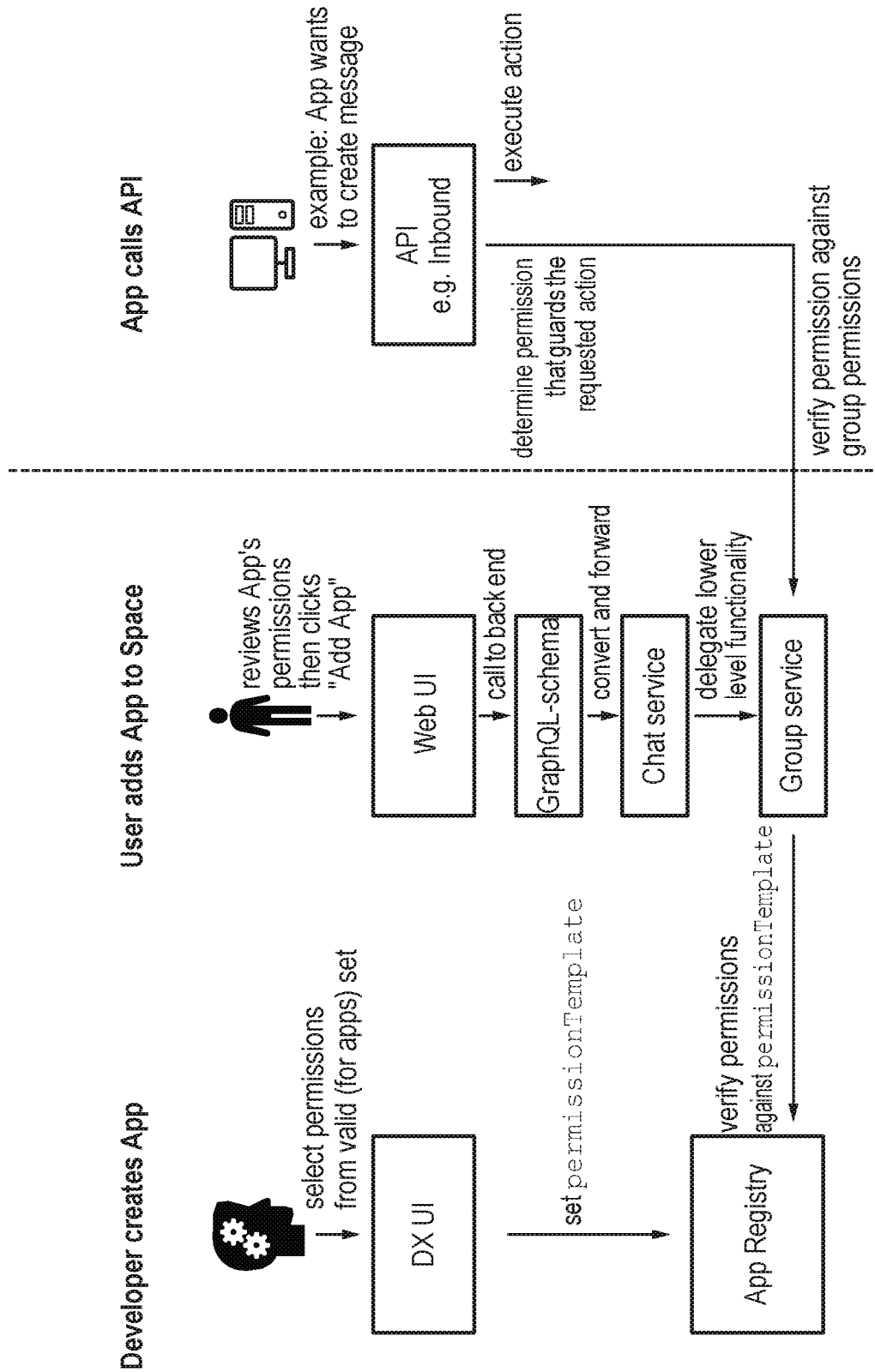
FIG. 5 shows data flows associated with a developer creating a new app, a user adding an app to an application and an app making an API call.

FIG. 5 shows data flows associated with a developer creating a new app, a user adding an app to an application and an app making an API call. The data flow associated with a developer adding a new app to an application is first described. The developer creates a new app and wants to allow the app, once it is added to an application, to be able to communicate with a higher level workspace, either by receiving outbound webhooks, by sending inbound webhooks, or by making API calls. The developer also wants the app to be configurable. The developer browses to a UI for developers (referred to in the art as a DX UI, where DX stands for developer experience) and clicks on a button or other feature to "Create a new app" and configures its permissions. One set of permissions is on behalf of the app which are the permissions that are to be displayed to an end user when the app is added to an application. The second set of permissions is on behalf of the user which are displayed to the end user during an OAuth flow. The developer may edit the lists of permissions and scopes (i.e. group and client permissions). Optionally, configuration may involve handling cross-overs between permissions and other app features. If, for example, an outbound webhook is added (same web page but different dialog) then the required permissions could be automatically checked or manually checked by the developer. For example, the DX UI dialogs will provide functionality to set and modify:
- group permissions on behalf of the app (e.g. stored in the permission Template and presented to the end user when an app is added to a space),
- client permissions on behalf of the app (e.g. not explicitly stored or presented to the end user, but the app can use these as soon as it has been created and is in possession of its app id and client secret, even without being added to a space),
- group permissions on behalf of a user, and/or
- client permissions on behalf of a user (used in the OAuth flow and then displayed to the end user).

Client permissions on behalf of an app become effective as soon as they are set in app registry. Adding the app to a space or an OAuth flow is not required. Permissions of an existing app will be managed in the same way as just described for creating an app, but without the creating steps.

The data flow associated with a user adding an app to an application as shown in the middle part of FIG. 5 is now described. The end user logs onto a web-based UI in which the available apps have their own buttons. Through a webpage the user selects an application for the app and also displays the permissions required by the app. By issuing a command to add the app, the user implicitly grants the requested permissions to the app. The user can then configure the app, to the extent the app is configurable. Interactions of the user with the WebUI lead to GraphQL calls to the server back end (GraphQL-schema). GraphQL requests and mutations are translated into REST API calls to internal micro services, for example the chat service, which may call other internal micro services, here group service and app registry. App registry stores the permissionTemplate, which is compared to the set of permissions of the app that is added to a space. These permissions are then stored in the database of the group service.

Finally, FIG. 5 also shows on the right-hand side how the data flow would be modified to accommodate app calls by an API. As in the other examples, the API would be able to seek verification of the existence of suitable permissions from the group service.

We now describe various use cases lying within the scope of the present disclosure. The parameters considered in the use cases are:
- permissions: permissions per identity, client or group
- app user: app acts on behalf of a user or on its own behalf
- actor: developer or end user The use cases relate to the four permutations which combine whether an app acts on its own behalf or on behalf of a user and whether the identity, i.e. actor, is a developer or an end user. The following use cases are described in terms of interactions via a UI. Direct calls to an application via an API would be similar.

Figure 6:
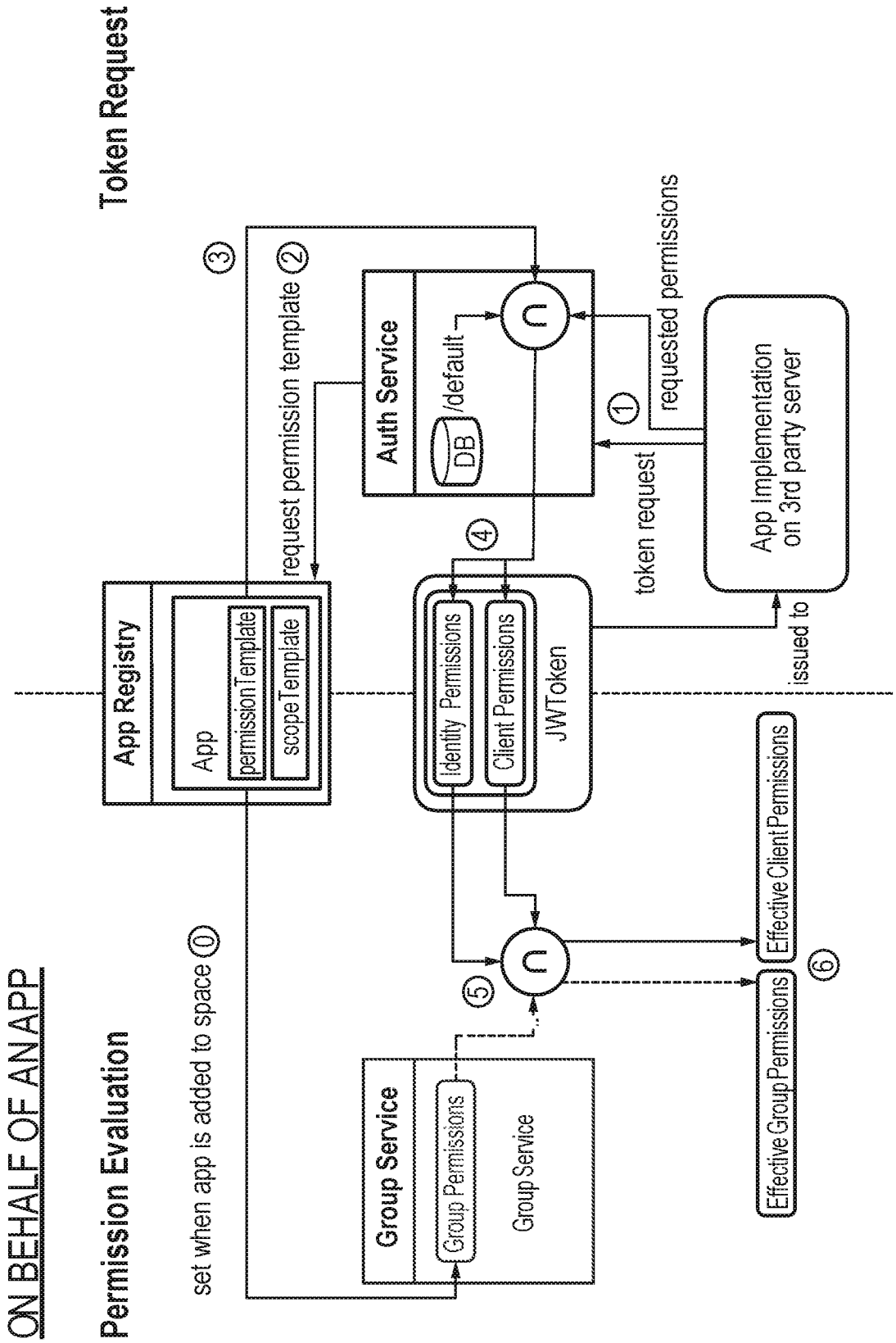
FIG. 6 shows how an app obtains a JWToken on its own behalf and also the subsequent permissions evaluation.

FIG. 6 shows how an app obtains a JWToken on its own behalf and also the subsequent permissions evaluation, e.g. to check if an API call can be made. In Step 0, when an app is added to a space, then the app's group permissions are set in the group service. This involves authorization by a user. In Step 1, the app, as implemented on a 3rd party server for example, issues a request for a JWToken and also sends the requested client permissions. In Step 2, the OAuth service asks the app registry for the permissionTemplate. In Step 3, the app registry returns the permissionTemplate and intersects it with the default identity permissions (or exceptions from the database). In Step 4, the resulting permission set is stored as an identity permissions set and a client permissions set in the new JWToken. In Step 5, identity and client permissions of the JWToken are intersected with each other and, optionally also when in a group context, with a group permissions set for the app. As a result of the intersection, in Step 6, the effective permissions are obtained, i.e. the effective group permissions set and the effective client permissions set. The effective group permissions are an intersection of the client permissions and the identity permissions (as before) and also the group permissions. Consequently, there are no effective identity permissions in this case because the intersection with the identity permissions is what defines the resulting set as "effective". The resulting set of effective permissions can then be compared to the required permissions for the requested action in the evaluation.

Figure 7:
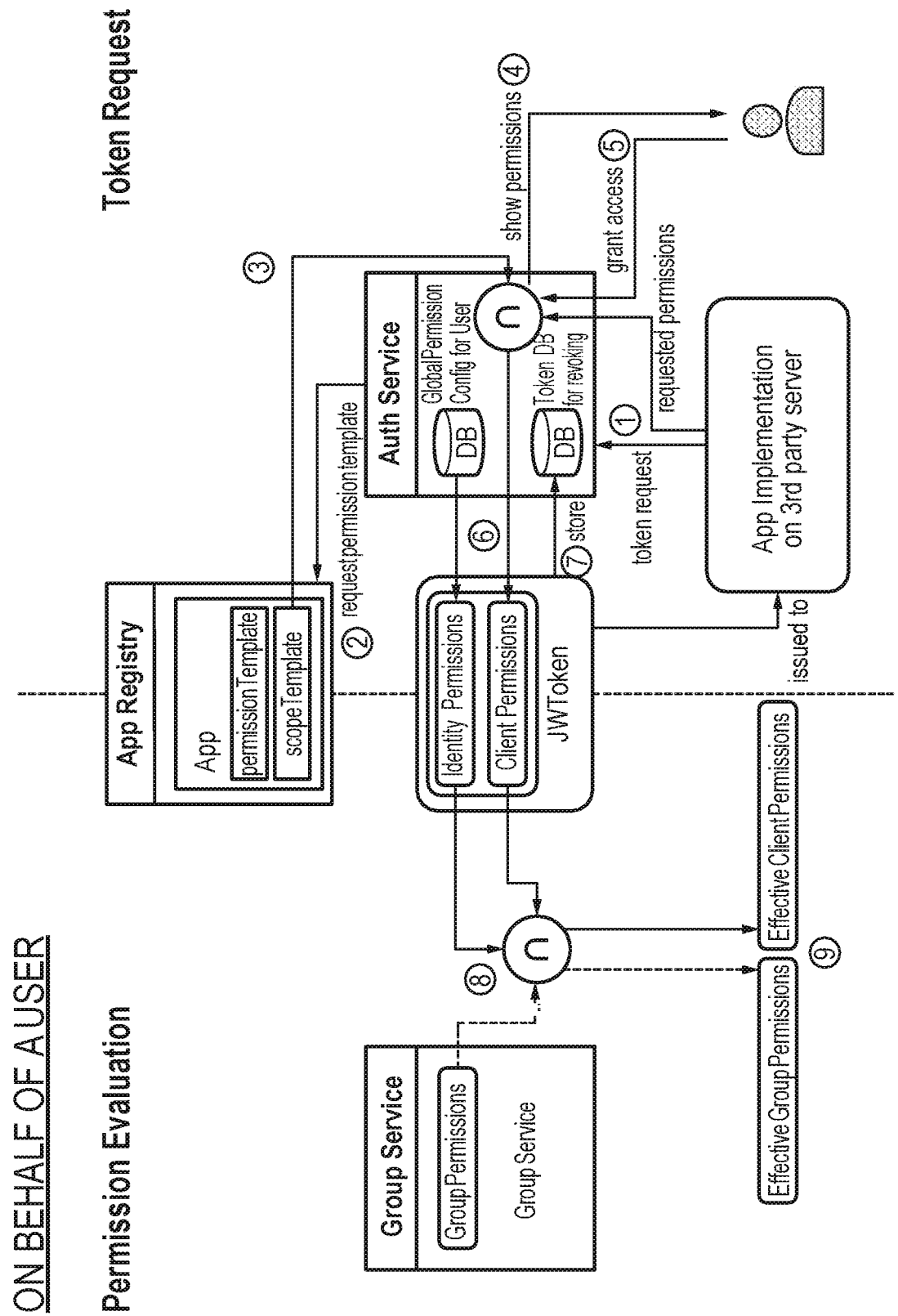
FIG. 7 shows how an app obtains a JWToken on behalf of a user and also the subsequent permissions evaluation.

FIG. 7 shows how an app obtains a JWToken on behalf of a user (n.b. user is a kind of identity) and also the subsequent permissions evaluation, e.g. to check if an API call can be made. In Step 0, when a user is added to a space, its group permissions are taken from the default set in the common library. In Step 1, the app which may be implemented on a third party server for example, makes a request for a JWToken on behalf of a user and also sends the requested permissions. In Step 2, the OAuth service asks app registry for the scope Template. In Step 3, the app registry returns the scopeTemplate. In Step 4, the OAuth service presents the permissions, after intersection with the requested permissions, to the user. In Step 5, the user grants access. In Step 6, the OAuth service creates the JWToken and stores in it as client permissions the permissions obtained from app registry intersected with the requested permissions, and as identity permissions, those obtained from the configuration for global permissions. In Step 7, information on the new JWToken is stored by the OAuth service in a token database for managing token status, including later token revocation. In Step 8, the identity and client permissions of the JWToken are intersected with each other and, optionally also when in a group context, with group permissions for the user (not the app). In Step 9, the effective permissions are obtained as the intersection result. The resulting set of effective permissions can then be compared to the required permissions for the requested action to perform the evaluation.

Figure 8:
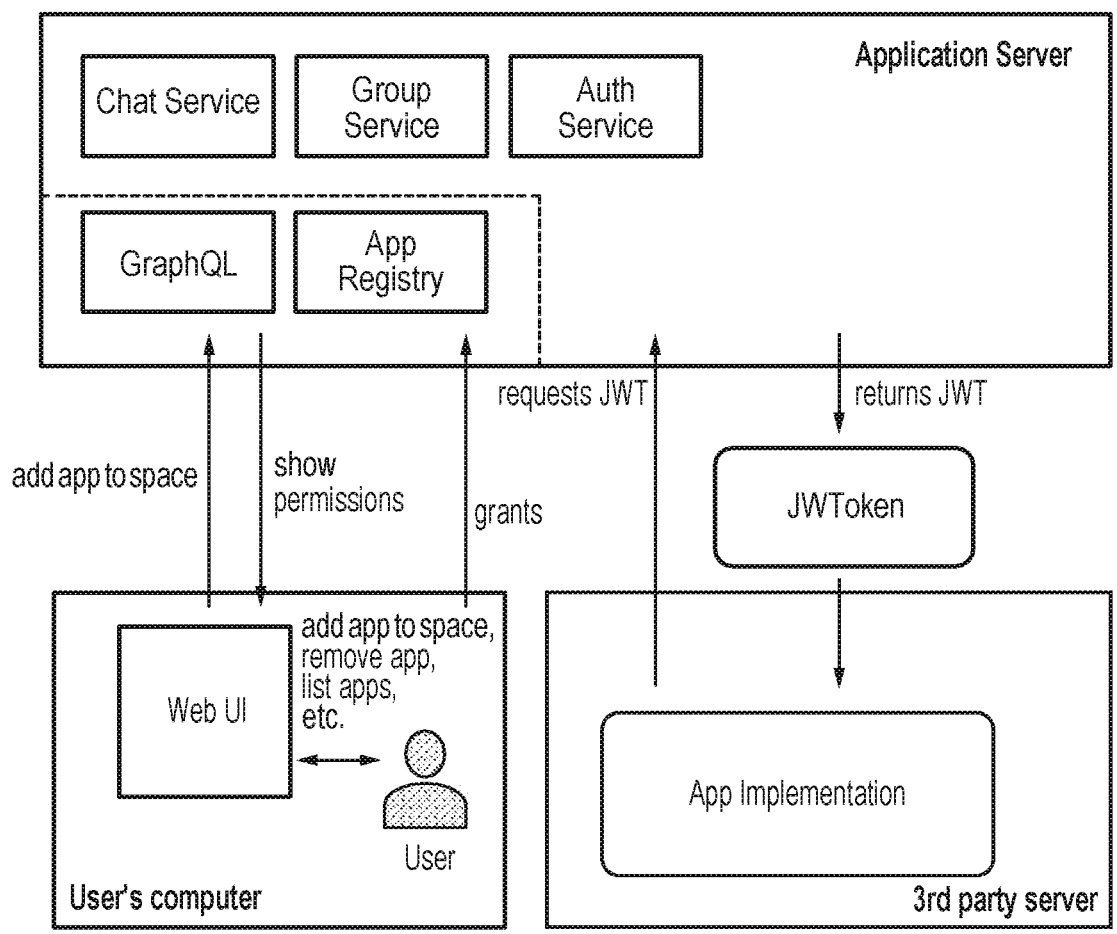
FIG. 8 shows the roles of the parties involved in lifecycle management of a JWToken issued on behalf of an app.

FIG. 8 shows the roles of the parties involved in lifecycle management of a JWToken issued on behalf of an app, i.e. as shown in FIG. 6. Three parties are involved in the management and life cycle of JWTokens that are issued on behalf of a user, namely the app, the user and the OAuth service. A token lifecycle starts with an app implementation, e.g. hosted on a 3rd party server, requests a token, for example for configuration of an app. The OAuth service, e.g. hosted on the application server, processes the new token request. Before the token is returned, the OAuth service sends a message to the relevant user, e.g. via a web UI, for authorization to grant the requested permissions to the requesting app. The OAuth service creates the token for the app conditional on receiving confirmation from the user that this is permitted. At any time thereafter, the user may revoke this token. More generally for token management, a user can at any time list all previously issued JWTokens on his or her behalf and revoke any or all of them.

Figure 9:
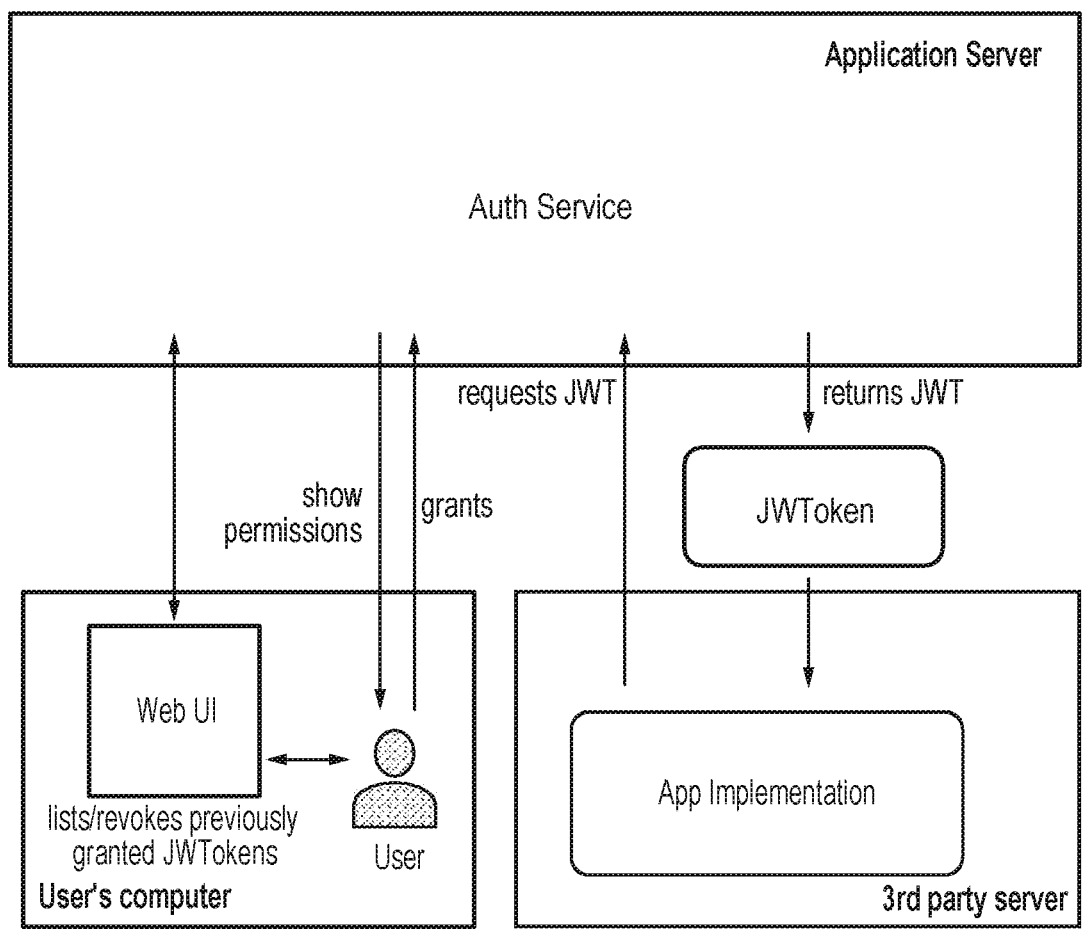
FIG. 9 shows the roles of the parties involved in lifecycle management of a JWToken issued on behalf of a user.

FIG. 9 shows the roles of the parties involved in lifecycle management of a JWToken issued on behalf of a user, i.e. as shown in FIG. 7. The management of JWTokens on behalf of apps follows from the actions of adding and removing apps to and from an application, since each app is associated with a set of permissions. User communication with an app will be mediated through the app registry and a client-server interface such as GraphQL. Other services, such as chat service, group service and OAuth service are involved in the background. Currently our system is designed such that JWTokens that have been issued to apps cannot be revoked directly, but become effectively revoked by the action of removing the app associated with the JWToken from the application. In other designs, facility to directly revoke tokens could be provided.

Figure 10:
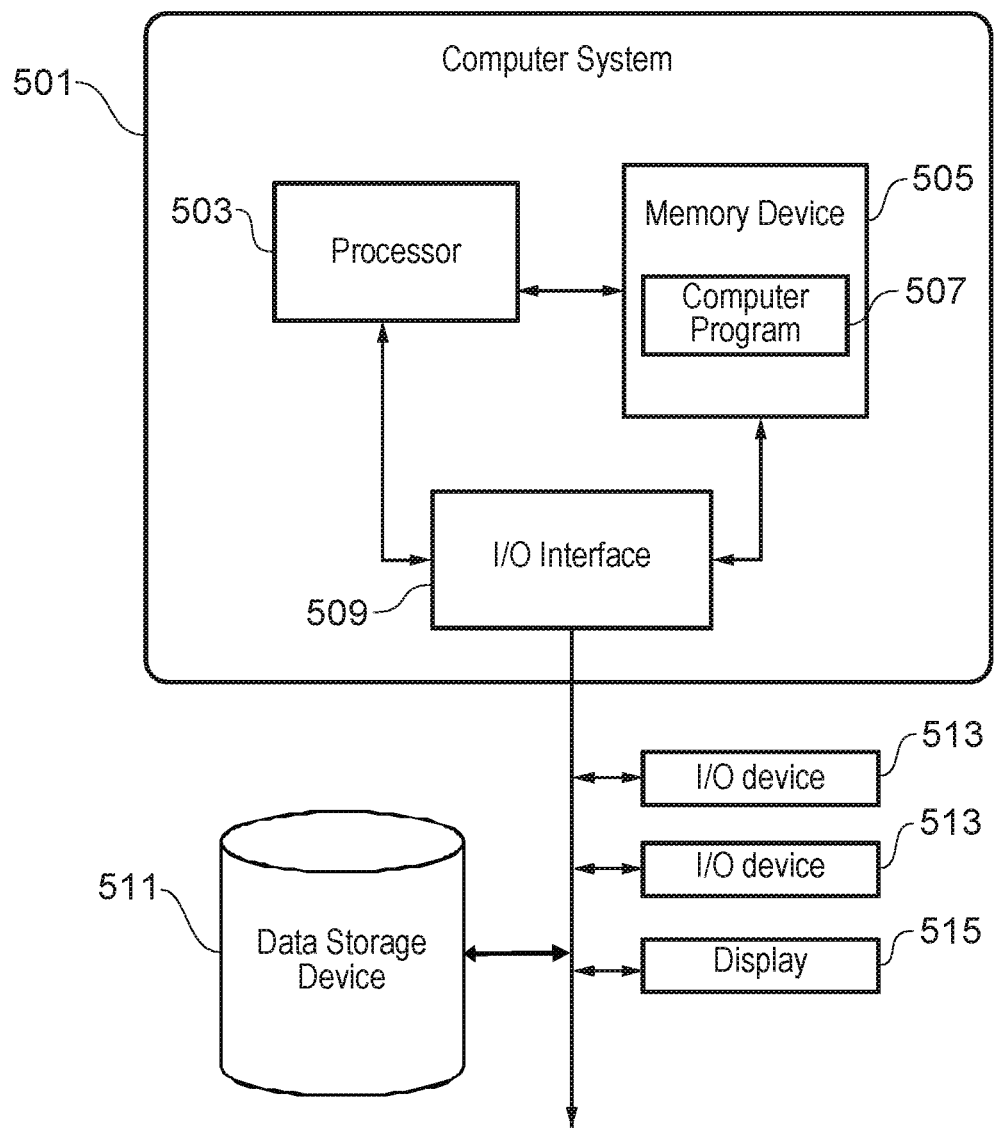
FIG. 10 shows a generic computer device which may be used as part of a computer system according to some embodiments of the invention.

FIG. 10 shows a structure of a computer system 501 and computer program 507 that may be used to implement embodiments of the invention, wherein the computer system may be a network node, such as a client or a server, such as the application server or third party server referred to above, and the computer program 507 may be an app or a microservice as referred to above. The computer system 501 comprises a processor 503 to provide a processor resource coupled through one or more I/O interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 to provide a memory resource contains stored computer program 507, which is a computer program that comprises computer-executable instructions. The data storage devices 511 may store the computer program 507. The computer program 507 stored in the storage devices 511 is configured to be executed by processor 503 via the memory devices 505. The processor 503 executes the stored computer program 507.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In summary, we have described a computer system and computer automated method relating to an application server operable to manage a microservice-based application, i.e. app, on behalf of clients, the clients being available for use by system actors who may be, for example, end users, bots, developers or other apps. A permissions validator is used to compute effective permissions in response to client requests. The requests are grant or denied conditional on the effective permissions being at least a subset of the permissions required to be given by any of the app's microservices that are needed for the resource being requested. The effective permissions are computed from an intersection of a set of actor permissions, a set of client permissions and a set of resource permissions.

It will be clear to one skilled in the art that many improvements and modifications can be made to the foregoing exemplary embodiment without departing from the scope of the present disclosure.

The invention claimed is:

1. A computer automated method to support management of an application for clients, the clients being available for use by system actors, and the application providing one or more resources for clients, each resource being associated with at least one application, and each application comprising a plurality of microservices, the method comprising:
receiving a request by a client, made under instruction of a system actor, to access a resource in order to perform a function;
computing, by a processor, a set of effective permissions in response to the request from an intersection of a set of actor permissions, a set of client permissions and a set of resource permissions, the actor permissions being permissions assigned to a system actor, the client permissions being permissions assigned to a client for said system actor; and the resource permissions being permissions assigned to the resource's requestable functions for said system actor; and
granting or denying, by the processor, the request conditional on the effective permissions being at least a subset of the permissions required to be given by any of the application's microservices that are needed for the resource being requested.

2. The method as recited in claim 1 further comprising:
generating a client-accessible permissions credential which stores an intersection of the set of actor permissions and the set of client permissions, wherein for computing the set of effective permissions, the permissions credential is read to extract the intersection of actor and client permissions, and then intersected with the resource permissions to arrive at the effective permissions.

3. The method as recited in claim 2, wherein at least one actor type has rights to manage permissions credentials.

4. The method as recited in claim 3, wherein said rights include at least one of: a right to request generation of a permissions credential, a right to revoke a permissions credential, and a right to show permissions credentials currently in existence.

5. The method as recited in claim 2, wherein the permissions credential is a token.

6. The method as recited in claim 5, wherein the token is a JSON web token.

7. The method as recited in claim 2, wherein a permissions validator computes the set of effective permissions, wherein the permissions validator is itself delivered as a microservice available to be called by the plurality of microservices.

* * * * *